Oct. 24, 1939.   K. E. BEMIS   2,177,166
METHOD OF AND MEANS FOR DEEP-FAT FRYING OF FOODS
Filed May 28, 1938   2 Sheets-Sheet 1
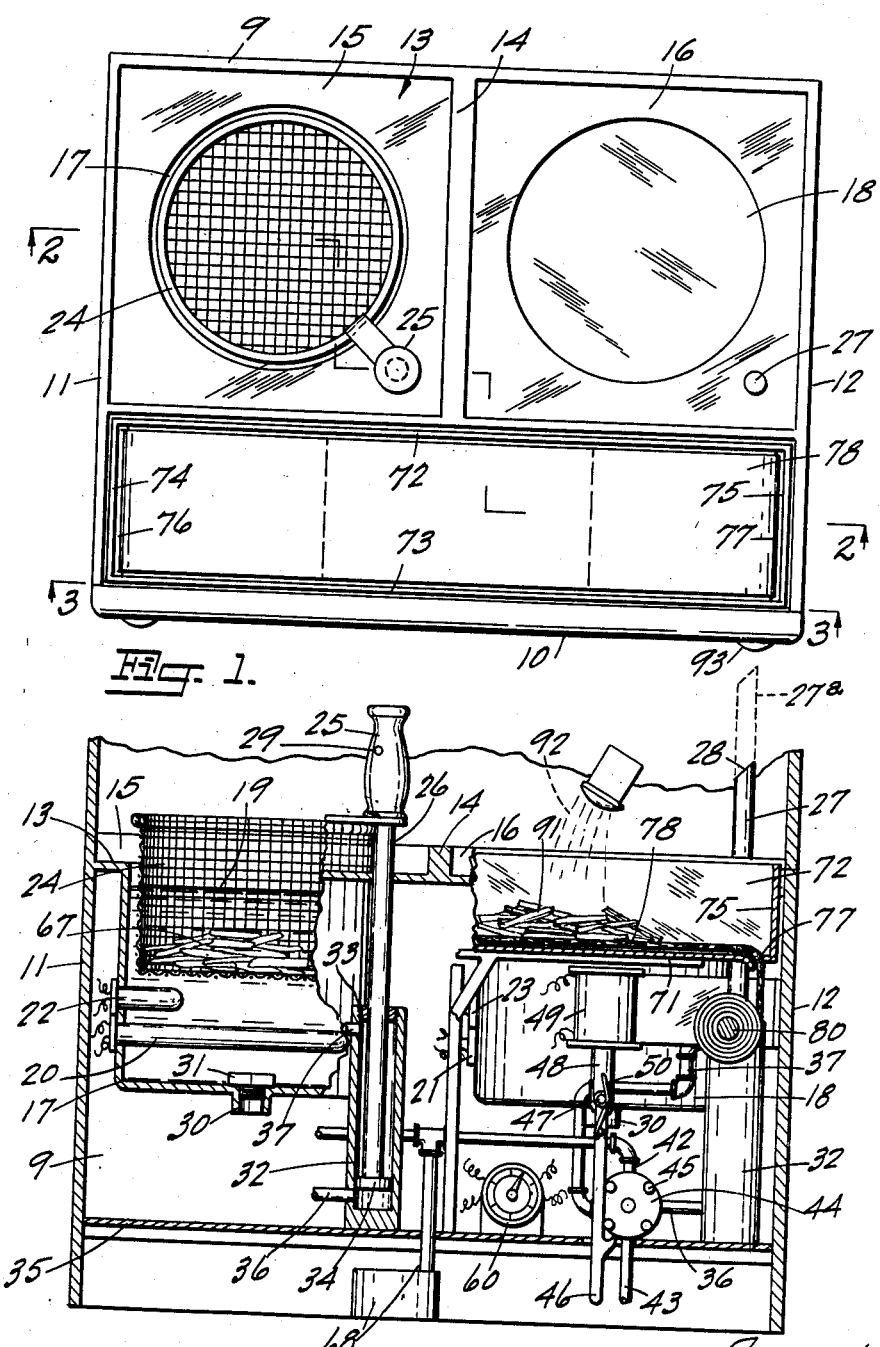

Oct. 24, 1939.    K. E. BEMIS    2,177,166
METHOD OF AND MEANS FOR DEEP-FAT FRYING OF FOODS
Filed May 28, 1938    2 Sheets-Sheet 2
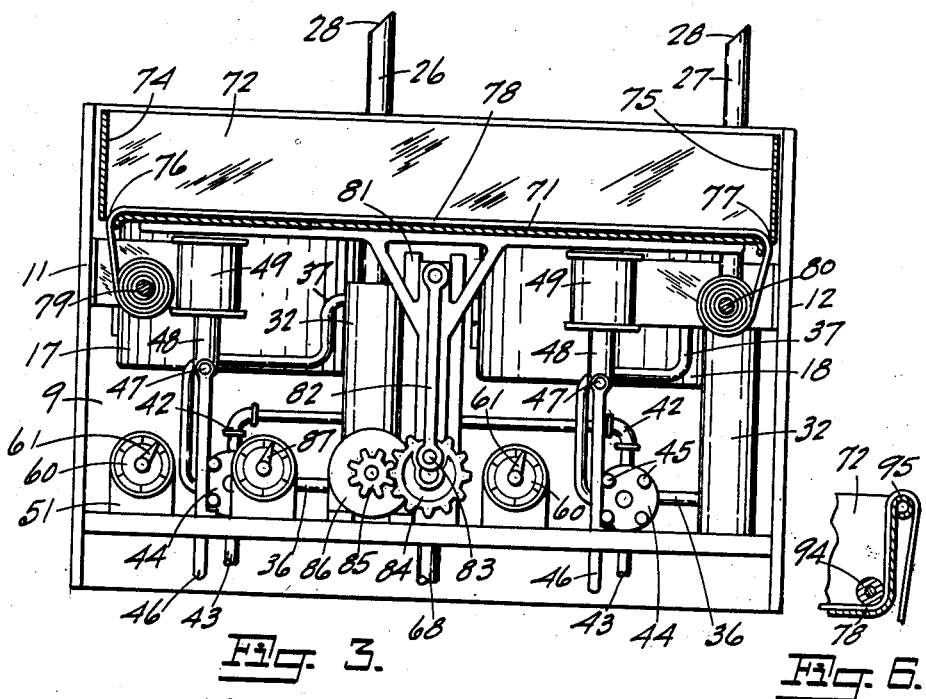
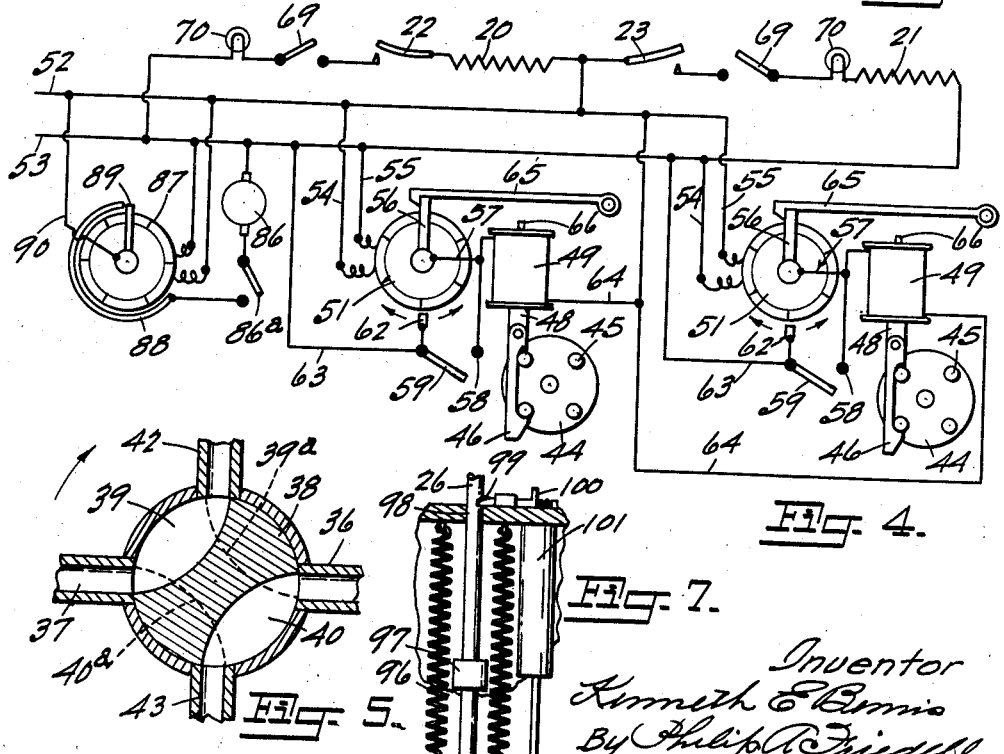
Inventor
Kenneth E. Bemis
By Philip A. Friedell
Attorney Patented Oct. 24, 1939

2,177,166

UNITED STATES PATENT OFFICE 2,177,166

METHOD OF AND MEANS FOR DEEP-FAT FRYING OF FOODS

Kenneth E. Bemis, Oakland, Calif.

Application May 28, 1938, Serial No. 210,668

11 Claims. (Cl. 34—1)

This invention, a method of, and means for deep-fat cooking of foods is particularly directed to the frying of potatoes, especially in the form of French-fried and shoe-string varieties, although the method and apparatus is equally applicable to the frying of doughnuts, crullers, chicken, and other foods adaptable to deep-fat frying.

In the usual process of frying shoe-string and French-fried potatoes, the potatoes are deposited in a bath of hot grease in which the cooking is started and carried through to completion, until suitably browned, then removed and drained, and, in some cases dumped onto a towel or other blotting medium to remove some of the excess grease, but obviously, the grease is not thus removed or blotted from any surfaces of the potatoes which do not come into direct contact with the blotting medium, therefore, the removal of excess grease is not efficiently effected.

In seasoning, the seasoning is sometimes sprinkled over the top of the batch, and in other cases seasoning is first deposited on the supporting surface on which the potatoes are to be deposited, followed by another supply of seasoning applied over the top of the batch, and in neither of these cases is the seasoning uniformly distributed and applied.

Starting and completion of the frying operation in a single bath does not produce the delectable quality which is possible of achievement with sequential two temperature cooking with proper timing of each stage of cooking.

This invention contemplates the cooking of potatoes in two stages, one of which stages is conducted in fat maintained at a blanching temperature of approximately 360°, and the other of which is conducted in fat maintained at a browning temperature of approximately 385° Fahrenheit, under which conditions the potatoes are substantially thoroughly cooked in the first stage and browned in the second stage, thereby obviating the possibility of the potatoes having an uncooked or improperly cooked center, or overly cooked exterior.

With this method, the potatoes having passed through the first, or blanching stage, may be retained in that state until a call for service is made, at which time the blanched potatoes can be placed in the browning bath and be ready to serve hot and fresh in about one minute, thereby providing for quick service of hot, fresh-fried potatoes.

This invention also contemplates the coincident blotting and seasoning of the potatoes immediately following the browning operation, which is carried out through coincident intense agitation, whereby all surfaces of the potatoes are acted upon by the blotting medium, and the seasoning medium is efficiently and uniformly applied to all surfaces of each portion of the potatoes, thereby providing an unusually delectable and uniform food product.

The invention further contemplates precision maintenance of temperatures, and automatic timing of the blanching, browning, and blotting and seasoning operations, and automatic removal of the potatoes from the respective fat baths, so as to obviate the possibility of over- or undercooking, and to eliminate the necessity of watchfulness on the part of the operator.

In describing the invention reference will be had to the accompanying drawings, in which:

Fig. 1 is a plan view of the invention.

Fig. 2 is a sectional elevation taken on line 2—2 of Fig. 1.

Fig. 3 is a front elevation of the invention with the front panel removed from the cabinet, and the front wall removed from the degreaser, and the view corresponds to a section taken on line 3—3 of Fig. 1.

Fig. 4 is a wiring diagram suitable for control and operation of the invention, and;

Fig. 5 is a sectional elevation through one of the lift-control valves.

Fig. 6 is a fragmentary view showing a modification of the web path and feed for the blotting medium.

Fig. 7 is a fragmentary view showing a modification of the lowering and raising means or lift.

The cabinet consists of a rear wall 9, a front panel 10, side walls 11 and 12, and a depressed top wall 13, with a partition 14 forming the top into two compartments 15 and 16.

Sealed into, and depending from the top wall in each compartment 15 and 16 is a kettle, respectively 17 and 18, both of which are filled with cooking oil or fat to a level 19, and each kettle is provided with a heating element, respectively 20 and 21 which are respectively controlled by the thermostatic switches 22 and 23 for maintaining the fat in the respective kettles at predetermined temperatures.

A basket 24 is formed of foraminous material and is used to support the potato strips or other foods to be cooked, in the cooking fat, and also for the purpose of draining superfluous fat from the foods when removed from the fat.

This basket is provided with a handle 25 formed with an axial passage to receive the bayonet type supports 26 or 27 which are beveled at their upper ends as indicated at 28. A pin 29 passing through the handle coincidently functions as a stop and an aligning or positioning device in cooperation with the beveled surface to position the basket over the center of the kettle.

A suitable nipple 30 and plug 31 are provided for each kettle for draining the kettles at will, and the top 13 of each compartment 15 and 16 drains fat back into the kettles.

The lowering and raising means for the basket is identical for both supports 26 and 27, and as illustrated, consists of a cylinder 32 which is provided with stop means in the form of a head 33 for cooperation with the piston 34 formed at the lower end of the support, as 26. The cylinder is suitably mounted, as on a base 35. Conduits 36 and 37 communicate respectively with the lower and upper ends of each cylinder and alternately function as inlet and discharge for the respective ends of the cylinder.

A four-way valve is provided for control of the lowering and raising means and consists of a valve body having a rotatable plug 38 which is provided with opposed channels 39 and 40, which are each designed to span at one time only two adjacent passages, whereby with each 90° rotative movement of the plug 38, the direction of flow of fluid through the valve is changed.

In the position shown in Fig. 5, fluid under pressure flows through pipe 42, channel 39, pipe 37, to the upper end of the cylinder 32, and water is drained from the lower end of the cylinder through pipe 36, channel 40, to drain 43. Rotation of the plug 38 through an angle of 90° moves the channel 39 around to span passages 36 and 42 as indicated at 39ª, and channel 40 is coincidently moved to span or connect passages 37 and 43, thereby supplying fluid under pressure to the bottom of the cylinder and draining the fluid from the upper end of the cylinder 32, channel 40 assuming the position indicated at 40ª. The plug may be rotated in either direction to accomplish the same result.

An actuating plate 44 is axially secured to the rotor and is provided with four equi-angularly spaced pins 45 for cooperation with a pawl 46 which is connected at its upper end, as at 47, to the core 48 of a solenoid 49, and urged to cooperate with the pins 45 by means of a spring 50.

The solenoid 49 is controlled by a timer 51 which may be of any suitable type, such as known types of electrical or mechanical timers, and is shown in diagrammatic form as an electrically-operated timer driven by a source of energy 52, 53, supplied through wires 54 and 55, and having a contact arm 56 connected through a wire 57 to one terminal of the solenoid 49 and in parallel to a contact 58 of a switch 59; the timer being provided with a suitable dial 60 and pointer 61 for setting the timer or adjusting the same for any desired elapsed time period.

A contact 62 is indicated as rotatably adjustable for the purpose previously specified, and is connected to the switch 59 and through a wire 63 to one side of the source of energy, as 53; the other terminal of the solenoid being connected through a wire 64 to the other side 52 of the source of energy.

Stop and release means for the timer is diagrammatically shown as consisting of a latch 65 which is adapted to be acted upon by a non-permeable plunger 66 attached to the core 48, at the terminal portion of the stroke of the core.

The operation of the parts so far described is as follows: Strip potatoes 67 or other food to be deep-fat fried, are placed in the basket 24 and the basket is mounted by its handle on one of the bayonets 26 or 27, according to which is associated with the desired temperature kettle. For French-fried or shoe-string potatoes, one kettle of fat is maintained at 360° and the other at 385° Fahrenheit, respectively for first operation blanching or cooking, and second operation browning. The bayonet is hydrostatically or otherwise locked in its raised position indicated at 27ª, which supports the basket above the surface of the hot fat.

Upon manual temporary closing of the switch 59, a circuit is completed through conductors 53, 63, 59, 58, to solenoid 49, thence through 64 to 52, energizing the solenoid, which through its core 48 and pawl 46 pulls up on the cooperative pin 45, rotating the plug 38 of the valve through an angle of 90° to the position 39ª—40ª, admitting fluid under pressure to the upper end of the cylinder and draining fluid from the lower end, thus permitting the basket to lower into the hot fat and immerse the food, as indicated in Fig. 2.

The final movement of the core 48 causes the plunger 66 to kick the latch 65 free from the contact arm 56, which is then driven counter-clockwise as viewed in the drawings, at slow speed until it reaches the contact 62 after a predetermined time period, and upon reaching this contact, the circuit is remade through 53, 63, 62, 56, 57, solenoid 49, and thence 64 to 52, again energizing the solenoid, which rotates the valve plug through another 90°, admitting fluid under pressure from a supply 68 through pipe 42, channel 39, pipe 36 to the lower end of cylinder 32, forcing the piston 34 up and raising the basket out of the kettle, the fluid coincidently draining from the upper end of the cylinder through pipe 37, channel 40 and drain 43; the arm 56 continuing its travel until stopped by the latch 65. The process is repeated in the other kettle for browning, the approximate blanching and browning periods being respectively, for shoe-string potatoes, four minutes and one minute, and varying according to the character of the food and its thickness or cross-sectional area.

The switches 69 are for the control of the heating elements, and the signal lamps 70 indicate when the temperature of the fat is below the predetermined minimum.

With this arrangement, no attention is required on the part of the operator after temporarily closing the switch 59, since the basket is automatically removed from the fat and drained at the expiration of the predetermined cooking period.

The degreaser consists of a pan or receptacle having a bottom 71, side walls 72 and 73, and end walls 74 and 75; the bottom having a passage or slot formed through each end from side wall to side wall as indicated at 76 and 77, through which a blotting medium, such as an absorbent paper web or towel 78 is threaded and which rests on the bottom 71 and has its terminal ends rolled on the respective spools 79 and 80, the exposed portion of the blotting means being co-extensive with the bottom of the pan.

The pan is suitably reinforced, and is guided for vertical reciprocation as indicated at 81, and has a connection 82 to a crank pin 83 on a gear 84 which is driven through a pinion 85 by a motor 86 which has one terminal connection to one lead 53 of the source of power. The other terminal of the motor is connected through a switch 86ª with a timer 87 which is of any suitable type, such as through a collector ring 88, contact arm or brush 89 and wire 90 to the other lead 52, whereby, as the arm rotates, it maintains circuit for the motor for a predetermined period of time following closing of the switch 86ª while the arm travels about the arcuate length of the ring 88; the arm stopping after it leaves the end of the arc for a subsequent operation.

The operation of the degreaser and seasoner is as follows: After the browned potatoes have drained, they are dumped into the degreaser as indicated at 91; switch 86ª is then closed and the motor 86 drives the gear 84, vertically reciprocating the pan at sufficient speed and with proper stroke to efficiently agitate and mix the food particles or portions and cause all surfaces thereof to contact the blotting medium. In the meantime, seasoning is added as indicated at 92, and, through the comparatively violent agitation of the batch of product, the seasoning becomes thoroughly and uniformly applied throughout and on all surfaces of the food.

After the food or potatoes are removed from the degreaser, the blotting medium is advanced through rotation of one of the rollers, as 80, by means of a knob 93.

The timer limits the operation of the degreaser to a predetermined period of operation, which is established at a value just sufficient to properly degrease and season the food.

A modification of the web path is illustrated in Fig. 6, in which a roller 94 is mounted at each end of the pan, and a roller, or curled edge 95 is formed at the top of each end wall, the web 78 being threaded under the rollers 94, up the end walls and over the top or rolled edges and thence down to the rollers 79 and 80.

A modification of the lowering and raising means is illustrated in Fig. 7 in which the bayonets, as 27 and 26 have tension springs 96 urging the bayonet up and which is slidably mounted in bearings 97 and 98, and which is provided with a slot 99 for cooperation with a latch 100, and an air check 101 is associated with the bayonet for slowing down its action under the urgence of the springs.

The latch 101 may be manually operated; however it is preferable to automatically actuate it and to incorporate timing means, in which case, a solenoid similar to 49 can be used with its core 48 connected to the latch.

With this arrangement, it becomes necessary to manually depress the plunger or bayonet to a point where it becomes locked in depressed position by the latch 100, and a timer similar to 51 can be used in a similar manner to time the release of the latch to permit the springs to raise the basket out of the kettle; the arrangement being obvious as to necessary connections, mechanical and electrical.

I claim:

1. A degreaser comprising; a receptacle having a bottom provided with a blotter passage at each end, and a blotter covering said bottom and extending through said passages; a roller for each end of said blotter, and means operable at will for manually advancing said blotter for renewal of the blotting surface within the receptacle; and reciprocating means and driving means therefor agitating said receptacle for thorough mixing and agitation of the food to cause complete superficial contact of the food with the blotter and thorough seasoning of the food upon addition of seasoning material during the period of agitation.

2. A structure as claimed in claim 1; and timing means associated with said agitating means limiting the operating period of agitation to a predetermined value.

3. In a deep-fat cooking machine, a food product degreaser comprising a pan having bottom, side, and end walls; a passage formed through the bottom adjacent each end wall and extending from one side wall to the other; and a roll of blotting medium having an intermediate portion resting on said bottom and substantially coextensive therewith and having its ends threaded through said passages; and rollers mounted for respectively taking in and paying out said blotting medium for renewal of blotting medium within the pan; and power means controllable at will for reciprocating said pan in a vertical plane for agitation of food products therein for degreasing the superficial areas of the respective portions of said food products, and for intimately associating seasoning materials deposited thereon during agitation.

4. A structure as claimed in claim 3; a timing device associated with said power means and adjustable as to elapsed time period of operation; for conducting agitation of said food product for a predetermined period only.

5. A degreaser, in combination; a receptacle for food products; blotting means in said receptacle and means including operating means for renewing said blotting means; agitating means for agitating said receptacle and power means for driving said agitating means.

6. A degreaser as defined in claim 5; timing means controlling operation of said agitating means and adjustable at will as to elapse-time period of agitation and limiting agitation to the adjusted elapse-time period.

7. A degreaser as defined in claim 5; said blotting means comprising a ribbon of blotting material feeding through passages formed in opposite ends of said receptacle and having a width substantially equal to the width of said receptacle; a roller in cooperative relation to each passage and associated with the opposite ends of the ribbon and forming the means for renewal of said blotting means by winding said ribbon from one roller to the other.

8. A degreaser as defined in claim 5; said agitating means confining agitation of said receptacle to a vertical plane and including guiding means guiding said receptacle for reciprocal agitation in a vertical plane while maintaining the relative angularity of the receptacle.

9. A degreaser as defined in claim 5; timing means controlling operation of said agitating means and adjustable at will as to elapse-time period of agitation and limiting agitation to the adjusted elapse-time period; said blotting means comprising a ribbon of blotting material feeding through passages formed in the opposite ends of said receptacle and having a width substantially equal to the width of said receptacle; a roller in cooperative relation to each passage and respectively associated with the opposite ends of said ribbon and forming the means for renewal of said blotting means by winding said ribbon from one roller to the other.

10. A degreaser as defined in claim 5; timing means controlling operation of said agitating means and adjustable at will with respect to elapse-time periods of operation and limiting agitation to the adjusted elapse-time period; said agitating means confining agitation of said receptacle to a vertical plane and including guiding means guiding said receptacle for reciprocal agitation in a vertical plane while maintaining the relative angularity of the receptacle.

11. A degreaser as defined in claim 5; timing means controlling operation of said agitating means and adjustable at will as to elapse-time period of agitation and limiting agitation to the adjusted elapse-time period; said blotting means comprising a ribbon of blotting materal feeding through passages formed in opposite ends of said receptacle and having a width substantially equal to the width of said receptacle; a roller in cooperative relation to each passage and respectively associated with the opposite ends of the ribbon and forming the means for renewal of said blotting means; said agitating means confining agitation of said receptacle to a vertical plane and including guiding means guiding said receptacle for movement in a vertical plane.

KENNETH E. BEMIS.